No. 651,087. Patented June 5, 1900.
G. W. REAM.
CULTIVATOR ATTACHMENT.
(Application filed Nov. 13, 1899.)
(No Model.)
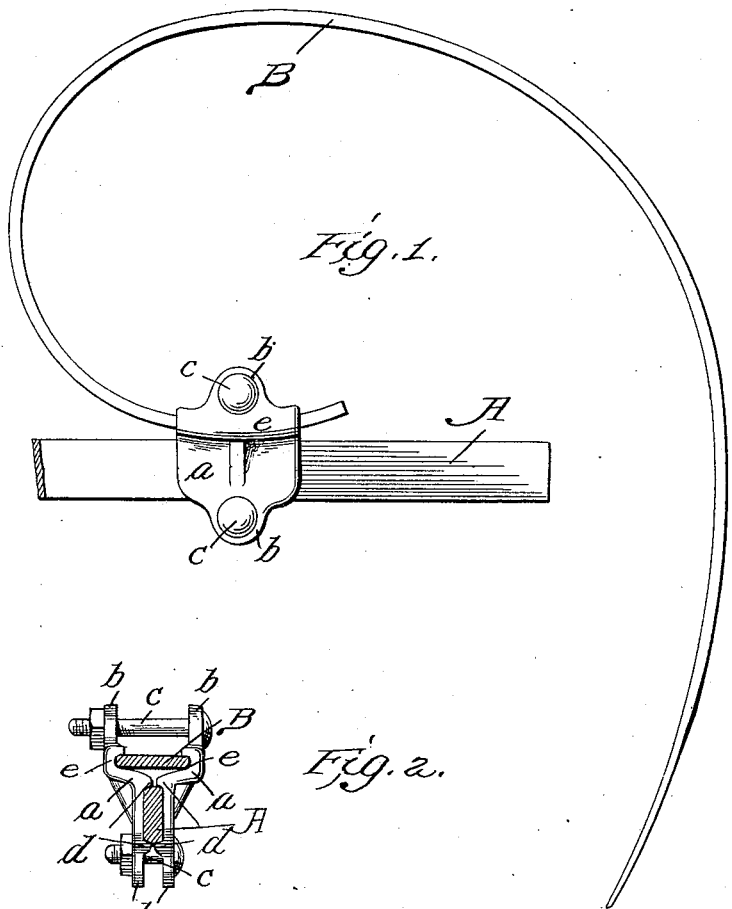

UNITED STATES PATENT OFFICE.

GEORGE W. REAM, OF CANTON, OHIO, ASSIGNOR TO THE BUCHER & GIBBS PLOW COMPANY, OF SAME PLACE.

CULTIVATOR ATTACHMENT.

SPECIFICATION forming part of Letters Patent No. 651,087, dated June 5, 1900.

Application filed November 13, 1899. Serial No. 736,853. (No model.)

*To all whom it may concern:*

Be it known that I, GEORGE W. REAM, a citizen of the United States, residing at Canton, Stark county, Ohio, have invented certain new and useful Improvements in Cultivator Attachments, of which the following is a specification.

My invention is an attachment for cultivators and is designed particularly as a tooth-holding clip interposed between the frame of the cultivator and the cultivator-tooth.

In the accompanying drawings, Figure 1 shows a short section of the bar of a cultivator with one of my improved clips clamped thereto and holding a spring-tooth. Fig. 2 is a sectional view of the same. Fig. 3 shows the clip with its holding members distorted or twisted in one direction, while Fig. 4 is a bottom view of a clip with its holding member distorted or twisted in the opposite direction.

A represents the bar or frame of the cultivator to which the teeth are connected. This bar is preferably of flat metal set on edge and the teeth are connected to it by means of my improved clips, one form of which I show in Figs. 1 and 2. This clip is made of two parts bolted together on the bar A by two bolts. The parts of the clip are identical and, being symmetrical, are interchangeable. They are made up of plates $a$, adapted to fit one upon each side of the flat bar, with ears at top and bottom, as at $b$, through which bolts $c$ pass, clamping the two parts of the clip together. The inner faces of the plates are provided with projections $d$, which fit over the upper and lower edges of the flat bar and prevent the clip from slipping when the parts are bolted in place. The said plates have lateral extensions $e$ on the upper ends, and these extensions are grooved and slightly curved to receive the corresponding edges of the spring-tooth B. The grooves of the lateral extensions securely grip the edges of the tooth and the two bolts fasten the parts of the clip tightly together and clamp the same both to the bar A and the tooth, making a very secure fastening.

When the clips are used in connection with what is known as an A-frame cultivator, where the outer bars of the A diverge to the rear, it is necessary to keep the teeth in parallel lines, as otherwise the strain would come laterally upon them, and in order to maintain the proper relation of the teeth I make the clips, as shown in Figs. 3 and 4, with their lateral extensions slightly twisted or distorted, so as to make up for the deflection of the side bars of the cultivator. The twisting of the clip will bring the cultivator-tooth in its proper relation regardless of the angular position of its supporting-bar.

As shown in Figs. 3 and 4, instead of having ears projecting from the upper part of the clips to receive the bolt for clamping the tooth this bolt may pass within the line of the gripping-jaws and be held as securely as when the bolt passes through the ears at the extreme upper end of the clip.

In using the clips on the outer divergent bars of an A-frame cultivator they may be inverted and grip the tooth below the bar instead of above, as in Fig. 1, and thus the depth of the teeth may be varied.

What I claim is—

An attachment comprising two plates adapted to be clamped to a supporting-bar, each plate having a right-angular flanged extension grooved to conform with and receive a tooth, and a clamping-bolt at each end of the plate, substantially as described.

In testimony whereof I affix my signature in presence of two witnesses.

GEORGE W. REAM.

Witnesses:
   W. H. CAVNAH,
   GEO. W. JAHN.